(12) United States Patent
Leif

(10) Patent No.: US 9,574,809 B2
(45) Date of Patent: Feb. 21, 2017

(54) APPARATUS AND METHOD FOR RECOVERING REFRIGERANT THROUGH A DOUBLE CONDUIT CONNECTION

(75) Inventor: Thyssen Leif, Sydals (DK)

(73) Assignee: Mahle International GmbH (DE)

( * ) Notice: Subject to any disclaimer, the term of this patent is extended or adjusted under 35 U.S.C. 154(b) by 389 days.

(21) Appl. No.: 13/552,376

(22) Filed: Jul. 18, 2012

(65) Prior Publication Data

US 2013/0025717 A1 Jan. 31, 2013

(30) Foreign Application Priority Data

Jul. 25, 2011 (EP) .................................... 11175145

(51) Int. Cl.
*F25B 45/00* (2006.01)
*F16L 29/02* (2006.01)
*F16L 29/04* (2006.01)

(52) U.S. Cl.
CPC ............... *F25B 45/00* (2013.01); *F16L 29/02* (2013.01); *F16L 29/04* (2013.01); *F25B 2345/00* (2013.01); *F25B 2345/001* (2013.01); *F25B 2345/002* (2013.01); *F25B 2345/004* (2013.01); *Y10T 29/49826* (2015.01); *Y10T 137/85978* (2015.04)

(58) Field of Classification Search
CPC . F25B 45/00; F25B 2345/00; F25B 2345/006; F25B 2345/001; F25B 2345/002; F25B 2345/004; F16L 29/04; F16L 29/02
USPC ....... 62/77, 292, 149; 137/563, 312, 614.06; 285/123.1; 251/149.9; 141/383–386, 311 A
See application file for complete search history.

(56) References Cited

U.S. PATENT DOCUMENTS

| | | | | |
|---|---|---|---|---|
| 910,213 | A * | 1/1909 | Mikesh et al. | 137/630.22 |
| 4,513,578 | A * | 4/1985 | Proctor | F25B 45/00 62/292 |
| 4,675,971 | A * | 6/1987 | Masserang | F25B 43/006 62/503 |
| 5,005,613 | A | 4/1991 | Stanley | |
| 5,139,049 | A * | 8/1992 | Jensen | F16L 37/34 137/614.03 |
| 5,156,190 | A * | 10/1992 | Staley, Jr. | 137/312 |
| 5,931,184 | A * | 8/1999 | Armenia et al. | 137/312 |
| 6,032,699 | A | 3/2000 | Cochran et al. | |
| 6,043,455 | A * | 3/2000 | Kurita | F24D 3/14 165/56 |
| 6,119,475 | A * | 9/2000 | Murray et al. | 62/292 |
| 6,129,107 | A * | 10/2000 | Jackson | 137/312 |

(Continued)

FOREIGN PATENT DOCUMENTS

| | | |
|---|---|---|
| CN | 101443590 A | 5/2009 |
| JP | 2006-132653 | 5/2006 |

OTHER PUBLICATIONS

English Translation of Second Chinese Office Action dated Apr. 21, 2016 for Chinese Application No. 201210256650.3 filed Jul. 24, 2012.

*Primary Examiner* — Orlando E Aviles Bosques
(74) *Attorney, Agent, or Firm* — Fishman Stewart PLLC

(57) ABSTRACT

An apparatus for transferring a fluid from and/or to a system, e.g., an air conditioning system, includes a main compartment having at least one pumping device for pumping the fluid from/to the system, an interface module having at least one gauge which is configured for displaying the pressure of the fluid, and a fluid connection fluidly connecting the gauge to the main compartment. The fluid connection is formed in a double conduit design in order to prevent any leakage of the fluid from the fluid connection.

10 Claims, 2 Drawing Sheets

(56) References Cited

U.S. PATENT DOCUMENTS

| | | | | |
|---|---|---|---|---|
| 6,134,899 A | * | 10/2000 | Brown et al. | 62/195 |
| 7,841,357 B2 | * | 11/2010 | Rankin | F16K 37/0033 |
| | | | | 285/93 |
| 2008/0276634 A1 | | 11/2008 | Brown et al. | |
| 2010/0064817 A1 | * | 3/2010 | Miyasaka | 73/741 |

* cited by examiner

APPARATUS AND METHOD FOR RECOVERING REFRIGERANT THROUGH A DOUBLE CONDUIT CONNECTION

BACKGROUND OF THE INVENTION

1. Field of the Invention

The invention is directed to an apparatus and a method for securely transferring (e.g. recovering, evacuating and/or charging) a fluid refrigerant from/to a refrigeration system.

2. Description of the Related Art

From time to time the refrigerant circulating in a refrigeration cycle, e.g. the refrigeration cycle of an air conditioning system, needs to be replaced and/or filled up in order to ensure proper operation of the refrigeration cycle.

Apparatuses for transferring, in particular recovering, evacuating and/or charging fluid from/to a system, in particular a refrigerant from/to a refrigeration cycle are known, e.g., from US Patent Application Publication 2008/0276634 A1.

However, as the fluid may comprise flammable substances, there is a need to ensure that the fluid does not exit to the environment and in particular that it does not come into contact with electric devices of the recovering-apparatus which could ignite the flammable substance comprised in the fluid.

BRIEF SUMMARY OF THE INVENTION

It is an object of the present invention to provide an improved apparatus for transferring fluid from/to a system which reliably ensures that said fluid is not released to the environment.

An apparatus for transferring, in particular recovering, evacuating and/or charging a fluid from/to a system, in particular an air conditioning system, according to the invention comprises a main compartment housing at least one pumping device, which is configured for pumping the fluid from the system; an interface module comprising at least one gauge, which is configured to display the value of the pressure of the fluid in the system and/or in the apparatus, and a fluid connection fluidly connecting the gauge with the main compartment. The fluid connection has a double conduit design in order to reliably prevent any leakage of the fluid from the fluid connection to the environment.

Using a double conduit design for connecting the gauge to the main compartment reliably ensures that said fluid is not released to the environment in case of leakage.

In an embodiment the connection comprises an inner conduit for providing a fluid connection between the gauge and the main compartment and an outer conduit, which is configured for receiving any fluid leaking out of the inner conduit. This provides an example for a double conduit design according to the invention which prevents fluid to exit from the fluid connection even in the case of failure (leakage) of the inner conduit and thus enhances the safety of the apparatus.

A method of fluidly connecting the gauge to the main compartment of an apparatus according to the invention comprises the step of connecting the inner conduit to the gauge only after the outer conduit has been connected to the gauge. This ensures that the outer (safety) conduit, which is configured to collect any fluid leaking out of the inner conduit, is present and connected to the gauge before the inner, fluid comprising conduit is connected. An unsafe operation of the apparatus with the outer conduit not being connected is reliably prevented.

In an embodiment the apparatus is configured to direct any fluid from the outer conduit into the main compartment. By directing, e.g. sucking, fluid from the outer conduit into the main compartment a pollution of the environment with fluid leaking out of the inner conduit is avoided. In the compartment the fluid is diluted to an extent where it does not pose any risk and then vented to the outside.

The apparatus may comprise a sensor indicating that fluid is present in the outer conduit in order to activate a pump for sucking the fluid from the outer conduit into the compartment and/or to give an acoustic or optic alarm signal. Alternatively a pump may be operating independently of fluid being present in the out conduit generating an underpressure within the outer conduit in order to avoid any fluid from leaking out of the outer conduit.

In an embodiment the apparatus comprises a fitting which is configured for connecting the double conduit to the gauge. The fitting is preferably brazed onto the body of the gauge in order to comply with the ATEX safety standard. A fitting provides a secure and sealed connection of the conduits to the gauge, which may be released e.g. for maintenance purposes. By brazing the fitting the gauge the fitting is securely and sealingly connected to the gauge.

In an embodiment the fitting is configured so that the inner conduit is connectable to the gauge before the outer conduit is connected to the gauge. This allows an easy connection of the conduits as the inner conduit accessible as long as the outer conduit is not connected to the gauge.

In an embodiment the fitting is configured so that the inner conduit is connectable to the gauge only after the outer conduit has been tightly connected to the gauge. This ensures that the outer conduit, which is configured for receiving the fluid in case of a leakage of the inner conduit, is always sealingly connected before the inner conduit is connected and a situation in which only the inner conduit but not the outer conduit is connected to the gauge is reliably prevented. This further enhances the safety of the apparatus as it is not possible to operate the apparatus without the outer conduit being sealingly connected.

In an embodiment the inner conduit comprises a safety valve which is configured to open only if the outer conduit is properly fixed to the gauge. This ensures that the inner conduit is fluidly connected only after the outer conduit has been properly connected to the gauge.

In an embodiment at least conduit is formed as a hose or as a pipe. Hoses and pipes respectively provide reliable fluid connections. Connecting the gauge to the main compartment by a hose provides a flexible connection allowing movement of the gauge relatively to the main compartment. A pipe provides a rigid and very secure connection.

In an embodiment the apparatus comprises two pumping devices and two gauges which are respectively configured for different pressure ranges, the two gauges being configured to measure the high and low pressure side of the system, respectively. An apparatus comprises two pumping devices allows to efficiently evacuate and/or charge a fluid from/to the system in two different pressure regimes. Two gauges allow verifying the pressure of both pumping devices reliably and with high accuracy covering pressures from vacuum pressure to pressures of more than 20 bars.

DETAILED DESCRIPTION OF THE INVENTION

Figure 1:
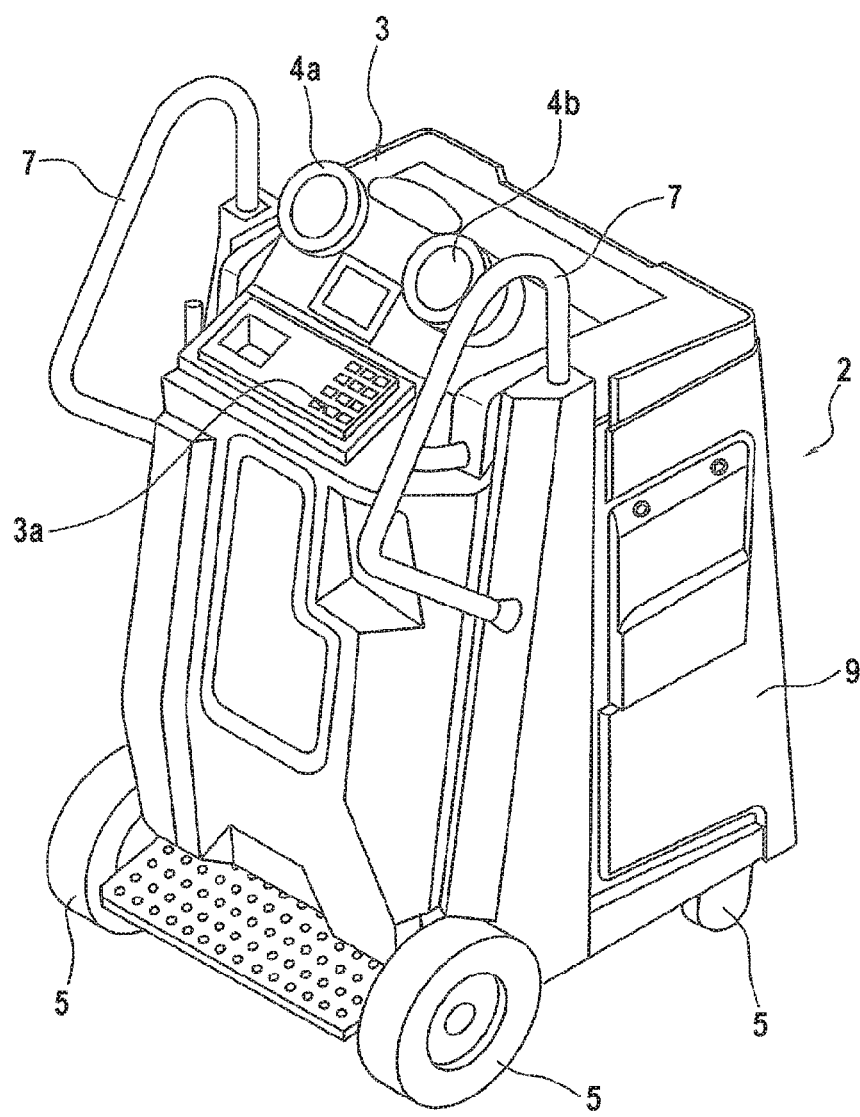
FIG. 1 shows a perspective view of an apparatus according to an exemplary embodiment of the invention.

FIG. 1 shows an exemplary embodiment of an apparatus 2 according to the invention comprising a main compartment 9 housing a pumping device, which is configured for pumping the fluid from/to the system and which is not visible in FIG. 1.

An interface for fluidly connecting the apparatus 2 to the system is provided at the rear side of the apparatus 2, which is also not visible in FIG. 1.

The apparatus 2 comprises rollers 5 and handles 7 in order to allow moving the apparatus 2 easily.

At its upper front side the apparatus 2 comprises an interface module (control panel) 3 comprising inter alia a keyboard 3a allowing to enter commands for controlling the operation of the apparatus.

Above the keyboard 3a the interface module 3 of the apparatus 2 shown in FIG. 1 comprises two gauges 4a, 4b which are configured to display, in operation, the pressure of the fluid transferred from/to the system. The embodiment shown in FIG. 1 comprises a low pressure gauge 4a (left) and a high pressure gauge 4b (right).

In order to display the pressure of the fluid, the gauges 4a, 4b need to be fluidly connected to a fluid reservoir located inside the main compartment 9.

Said fluid connection, which may be realized by a pipe or hose, represents a location which is critical for the safety of the apparatus 2, as fluid may be distributed to the environment if said connection leaks. Since said fluid connection is located close to the electrical components comprised in the interface module 3, any leakage of fluid comprising inflammable components from said connection is very dangerous, as fluid leaving the connection through the leak may immediately come into contact with the electrical components of the interface module 3, which might ignite the flammable components of the fluid.

One solution of this safety problem would be to design the electrical components of the interface module 3 in accordance with the ATEX, ANSI/ISA 12.12.01 safety standard. This, however, would be expensive and would not prevent leaking fluid from being ignited by other means.

Therefore, according to the invention, the conduit connecting the gauges 4a, 4b to the main component 9 is designed so that the distribution of fluid from said conduit to the environment is reliably prevented.

Figure 2:
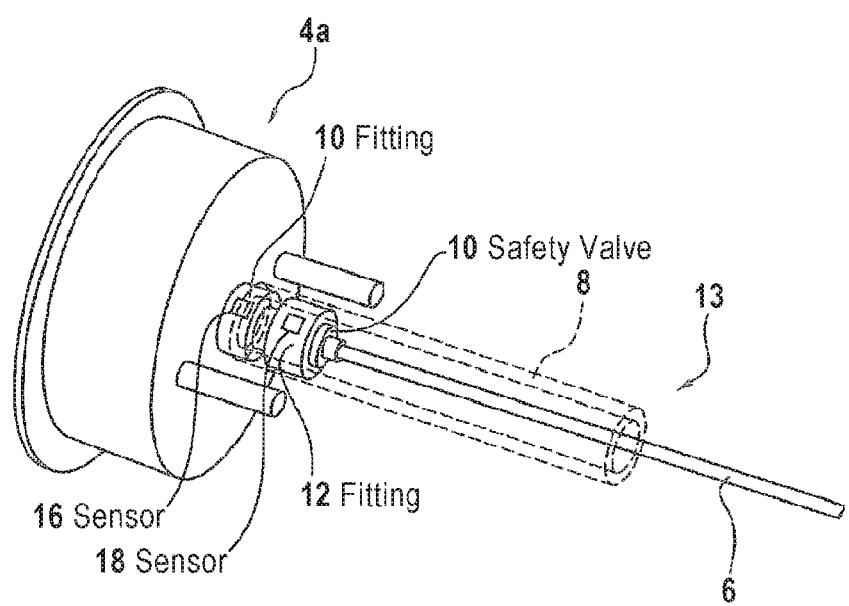
FIG. 2 shows an enlarged view of a gauge of the apparatus securely connected to a conduit.

FIG. 2 shows details of an embodiment of the invention, in particular the back side of one of the gauges 4a connected to a conduit 13.

The conduit 13 is realized in a double conduit design comprising an inner conduit 6 fluidly connecting the gauge 4a to a pressurized fluid reservoir located within the main compartment 9 and an outer conduit 8 enclosing the inner conduit 6.

In case of a leakage of the inner conduit 6 the fluid leaving the inner conduit 6 through said leak will be collected in the outer conduit 8 instead of being discharged to the environment. The end of the outer conduit 8 located at the side of the main compartment may be fluidly connected to a pumping device, which is configured for pumping said fluid into the main compartment 9 for further use.

The conduits 6, 8 may be respectively formed as a hose or a pipe or a combination thereof.

In order to ensure a reliable and sealingly enclosed connection between the gauge 4a and the outer conduit 8 a fitting 10 is brazed to the body of the gauge 4a. The fitting 10 is configured for receiving a corresponding fitting 12 which is sealingly fixed to the outer conduit 8. The fittings 10, 12, which might for example be realized as a plug and a socket ensure a reliable and sealingly enclosed connection between the gauge 4a and the outer conduit 8.

The fittings 10, 12 may further provide a fluid connection of the inner conduit 6 to the gauge 4a, which may be configured so that the inner conduit 6 may be fluidly connected to the gauge 4a only after the outer conduit 8 has been properly connected to the gauge 4a.

The fittings 10, 12 may further comprise sensors 16, 18, which are configured to allow the operation of the apparatus 2 only after and as long as the fittings 10, 12 are properly connected.

Alternatively or additionally the fitting 10, 12 connecting the inner conduit 6 may comprise a safety valve 15, which is configured to open only after the fitting 12 has been securely fixed to the corresponding fitting 10 of the gauge 4a in order to avoid that fluid is distributed from the inner conduit 6 to the environment in case the fitting 12 is not securely connected to the gauge 4a.

What is claimed is:

1. An apparatus for transferring a fluid at least one of from and to an air conditioning system, the apparatus comprising:
   a main compartment having at least one pumping device pumping the fluid at least one of from and to the air conditioning system;
   an interface module having at least one gauge which is configured to display the pressure of the fluid;
   a fluid connection fluidly connecting the gauge to the main compartment, wherein the fluid connection is formed in a double conduit configuration to prevent leakage of the fluid from the fluid connection, the double conduit configuration including an inner and an outer conduit, wherein the outer conduit is configured to receive any fluid leaking out of the inner conduit, and wherein the inner and outer conduits are substantially concentric to one another, the outer conduit being in communication with the main compartment;
   at least one fitting connecting the inner and outer conduits to the gauge, the at least one fitting including at least one sensor configured to allow operation of the apparatus only after the at least one fitting is properly connected;
   a leakage pumping device to which the outer conduit is fluidly connected, the leakage pumping device being configured to pump a leaking fluid stream from the outer conduit into the main compartment when the inner conduit leaks the leaking fluid stream; and
   a sensor configured to sense the leaking fluid stream in the outer conduit in order to activate the leakage pumping device;
   wherein the at least one fitting is permanently attached to a body of the gauge, wherein the outer conduit is fluidly connected to the leakage pumping device, which is configured for pumping the leaking fluid stream into the main compartment.

2. The apparatus of claim 1, wherein at least a portion of the fitting is brazed onto the body of the gauge.

3. The apparatus of claim 1, wherein the at least one gauge is fluidly connected to a reservoir located inside the main compartment.

4. The apparatus of claim 1, wherein the fluid connection is disposed adjacent to a plurality of electrical components in the interface module, wherein the leaking fluid stream is directed to the main compartment by way of the outer conduit rather than coming in contact with the plurality of electrical components.

5. The apparatus of claim 1, wherein the fluid connection includes:
   the inner conduit providing a fluid connection between the gauge and the main compartment.

6. The apparatus of claim 5, wherein the inner conduit includes a safety valve.

7. The apparatus of claim 5, wherein at least one of the inner and outer conduits is formed as one of a hose or a pipe.

8. The apparatus of claim 5, wherein the at least one pumping device includes at least two pumping devices which are configured for two different pressure ranges.

9. The apparatus of claim 5, wherein the at least one gauge includes at least two gauges which are configured for two different pressure ranges.

10. A method of fluidly connecting a gauge configured to display the pressure of a fluid to a main compartment of an apparatus for transferring the fluid at least one of from and to an air conditioning system, the method comprising:

providing an inner conduit for a fluid connection between the gauge and the main compartment, and an outer conduit configured to receive any fluid leaking out of the inner conduit, wherein the inner and outer conduits are substantially concentric to one another;

connecting the inner conduit to the gauge only after connecting the outer conduit to the gauge with at least one fitting, the at least one fitting including at least one sensor configured to allow operation of the apparatus only after the at least one fitting is properly connected;

permanently attaching the at least one fitting to a body of the gauge;

connecting at least one pumping device to the outer conduit and the main compartment, the at least one pumping device being configured to pumping the leaking fluid received on the outer conduit from the outer conduit to the main compartment; and providing a sensor configured to sense the leaking fluid in the outer conduit in order to activate the at least one pumping device.

* * * * *